Patented July 9, 1929.

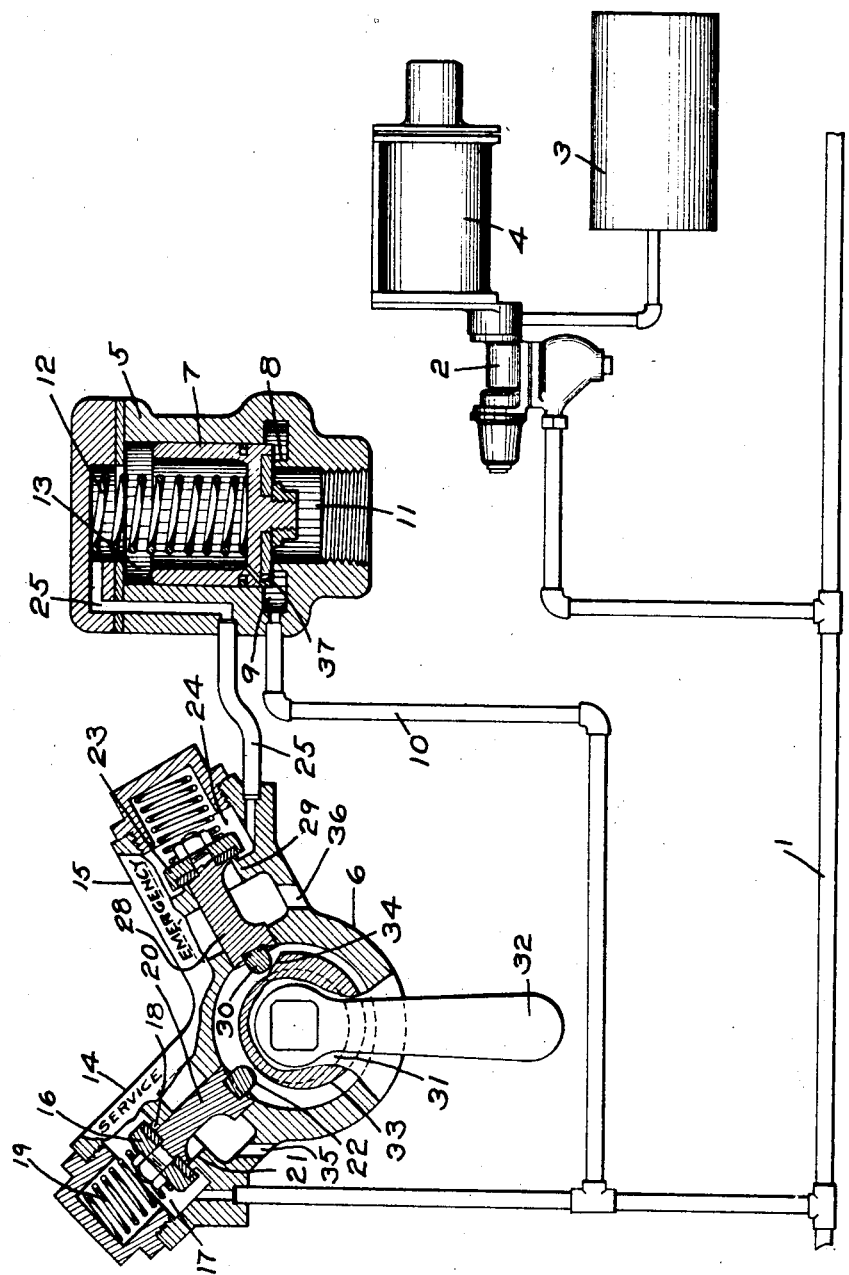

1,720,267

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed October 3, 1927. Serial No. 223,532.

This invention relates to fluid pressure brakes and has for its principal object to provide means whereby the trainman on a caboose may make either a service or an emergency application of the brakes.

In the accompanying drawing, the single figure is a diagrammatic view, partly in section, of a fluid pressure brake equipment for a caboose, and embodying my invention.

As shown in the drawing, the equipment may comprise the usual brake pipe 1, a triple valve device 2, an auxiliary reservoir 3, and a brake cylinder 4.

According to my invention, a relay conductor's valve device 5 and a brake controlling valve device 6 are provided. The valve device 5 may comprise a casing containing a valve piston 7, the valve piston being provided at one end with a seat adapted to seat on a rib 8. In the seated position, chamber 9, outside the rib seat 8, which is connected by pipe 10 with the brake pipe 1, is cut off from an atmospheric exhaust outlet 11.

A coil spring 12, contained in the chamber 13 at the opposite side of the valve piston, urges said valve piston to its seat.

The valve device 6 comprises a casing having a base section and two cylindrical sections 14 and 15 extending radially from the base section.

Mounted in the section 14, is a poppet valve 16 contained in a valve chamber 17 which chamber is connected to the brake pipe 1. The valve 16 is urged against a seat rib 18 by a coil spring 19, contained in the chamber 17. The valve 16 is provided with a stem 20 which extends through an opening in the wall 21 and is provided at its outer end with a rounded bearing member 22.

The section 15 contains a valve 23 which is mounted in valve chamber 24, which chamber is connected through a pipe and passage 25 with the chamber 13. The valve 23 is urged against a seat rib 26 by a coil spring 27, contained in the valve chamber 24.

Carried by the valve 23 is a stem 28, which extends through an opening in wall 29 and is provided at its outer end with a bearing member 30.

Mounted in a central bore of the base section of the valve device is a rotatable member 31 having an operating handle 32 and provided with a slowly rising cam face 33 adapted to engage the bearing member 22, when the handle 32 is rotated in a clockwise direction.

The member 31 is also provided with an abrupt rising cam face 34 which is adapted to engage the bearing member 30 when the handle 32 is rotated in a counter-clockwise direction.

In operation, the handle 32 is normally maintained in the position shown. If the trainman desires to effect a service application of the brakes, he moves the handle 32 toward the left and the cam surface 33 then engages the bearing member 22. The valve 16 is thus unseated and fluid under pressure is vented from the brake pipe 1 to the atmosphere by way of port 35. The rate of venting may be as gradual as desired, and varies according to the position of the handle 32 and the cam surface 33. The maximum rate, however, is limited to a service rate by the size of the outlet port 35, so that even if the handle 32 be moved to full extent toward the left, only a service rate of reduction in brake pipe pressure will be effected.

If the trainman wishes to effect an emergency application of the brakes, he turns the handle 32 toward the right, so that the cam face 34 acts on the bearing member 30 to quickly open the valve 23.

With the valve 23 open, fluid under pressure is vented from chamber 13 through pipe 25 to the atmospheric port 36, it being understood that, normally, with the valve 23 seated, fluid under pressure equalizes from chamber 9, which is charged from the brake pipe 1, through a restricted port 37 in piston 7 to chamber 13, so that normally the pressure in chamber 13, with the pressure of spring 12, holds the valve piston 7 seated.

When fluid is vented from chamber 13, the fluid pressure acting in chamber 9 on the exposed area of the valve piston 7, causes the upward movement thereof, so that communication from the brake pipe 1 to the atmospheric outlet 11 is established.

A sudden reduction in brake pipe pressure is thus caused and thereby an emergency application of the brakes is effected.

While one illustrative embodiment of the invention has been described in detail, it is not my intention to limit its scope to that embodiment or otherwise than by the terms of the appended claims.

Having now described my invention, what

I claim as new and desire to secure by Letters Patent, is:—

1. In a fluid pressure brake, the combination with a brake pipe, of means on the rear vehicle of a train for effecting a sudden reduction in brake pipe pressure comprising a relay valve device operated upon a reduction in fluid pressure for effecting a sudden reduction in brake pipe pressure, and a manually operable controlling valve device on the rear vehicle for venting fluid from said relay valve device.

2. In a fluid pressure brake, the combination with a brake pipe, of means on the rear vehicle of a train for effecting either a gradual or a sudden reduction in brake pipe pressure comprising a valve device having a valve for effecting a gradual venting of fluid from the brake pipe, a valve for effecting a sudden venting of fluid from the brake pipe, and a rotatable member for operating said valves having a gradually rising cam face for operating the first valve and an abrupt cam face for operating the other valve.

3. In a fluid pressure brake, the combination with a brake pipe, of means on the rear vehicle of a train for effecting either a gradual or a sudden reduction in brake pipe pressure comprising a valve device having a valve for effecting a gradual venting of fluid from the brake pipe, a valve for effecting a sudden venting of fluid from the brake pipe, and a rotatable member for operating said valves, and a handle for rotating said member.

4. In a fluid pressure brake, the combination with a brake pipe, of means on the caboose of a train for effecting either a gradual or a sudden reduction in brake pipe pressure comprising a relay valve operated upon a reduction in fluid pressure for venting fluid from the brake pipe at a rapid rate, and a controlling valve device having a valve for venting fluid from said relay valve device, a valve for venting fluid from the brake pipe at a gradual rate, and manually operated means for operating said valves.

5. In a fluid pressure brake, the combination with a brake pipe, of means on the caboose of a train for effecting either a gradual or a sudden reduction in brake pipe pressure comprising a relay valve operated upon a reduction in fluid pressure for venting fluid from the brake pipe at a rapid rate, and a controlling valve device having a valve for venting fluid from said relay valve device, a valve for venting fluid from the brake pipe at a gradual rate, and manually operated means for operating one valve upon movement in one direction and for operating the other valve upon movement in the opposite direction.

In testimony whereof I have hereunto set my hand.

CLYDE C. FARMER.